(No Model.)

G. W. FLOTT & J. OVERACKER.
CORN PLANTER CHECK ROWER.

No. 289,906. Patented Dec. 11, 1883.

Witnesses:
J. Lorum.
Joseph O. Morris.

Inventors:
George W. Flott
and John Overacker
By Peirce & Fisher
Attorneys.

UNITED STATES PATENT OFFICE.

GEORGE W. FLOTT AND JOHN OVERACKER, OF DANFORTH, ILLINOIS.

CORN-PLANTER CHECK-ROWER.

SPECIFICATION forming part of Letters Patent No. 289,806, dated December 11, 1883.

Application filed July 7, 1883. (No model.)

*To all whom it may concern:*

Be it known that we, GEORGE W. FLOTT and JOHN OVERACKER, of Danforth, in the county of Iroquois and State of Illinois, have invented certain new and useful Improvements in Corn-Planter Check-Rowers, of which we do declare the following to be a full, clear, and exact description, reference being had to the accompanying drawings, forming part of this specification.

Our present invention has relation to improvements in corn-planters of that class in which the seeding mechanism of the planter is automatically actuated at proper intervals as the planter traverses the field by the knobs or tappets upon a check-row cord or wire stretched across the field.

The object of the invention is to provide a cheap and simple construction and arrangement of parts by which the dropping of the grain may be effected with certainty and regularity, and this object we have accomplished by the improvements hereinafter described, illustrated in the accompanying drawings, and particularly defined in the claim at the end of the specification.

Figure 1:
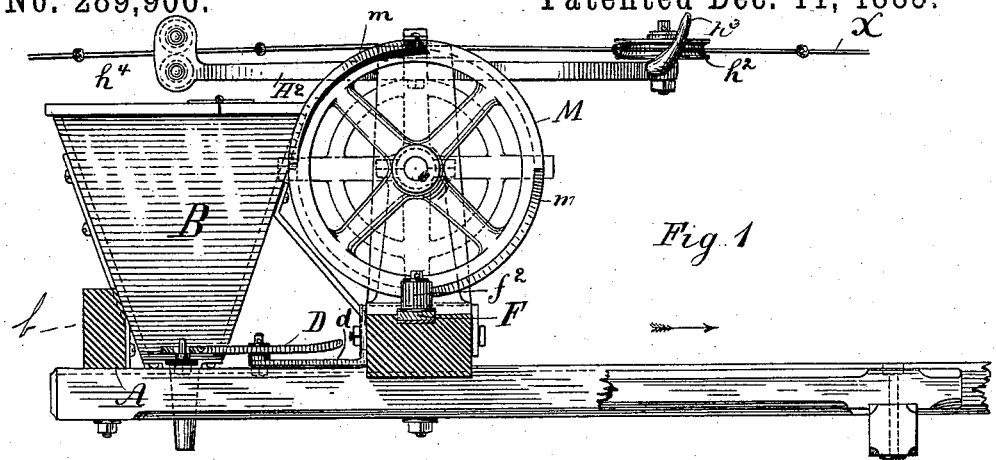
Figures 2, 3:
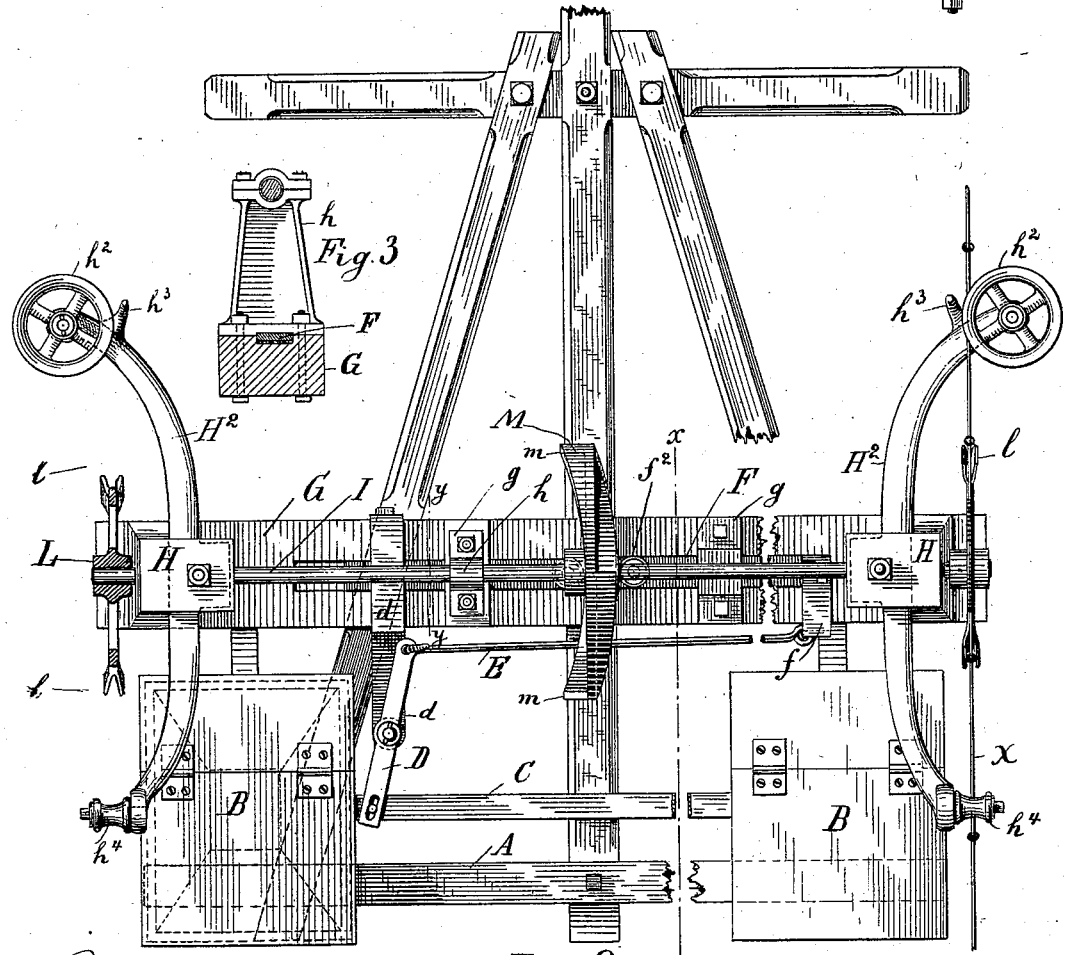

Figure 1 is a view of the planter in central longitudinal section on line $xx$ of Fig. 2. Fig. 2 is a plan view, parts being broken away for better illustration. Fig. 3 is a sectional view on line $yy$ of Fig. 2.

Upon the main frame A of each side of the corn-planter are carried the seed-boxes B, which are of usual construction, are braced by the rods $b$, and are provided at their bottoms with suitable slides controlled by the feed-bar C, the novel combination of mechanism for operating which bar constitutes the essence of the present invention. This feed-bar C is connected, through the medium of the lever D, pivoted to the bracket $d$, and the link E, to the angular arm $f$, extending outwardly and downwardly from the slide-bar F, which is held in a manner free to move in direction of its length by the guide-plates $g$, bolted to the top of the main cross-bar G. From this cross-bar rise the main end standards, H, and the intermediate standard, $h$, in which is suitably journaled the main shaft J, which carries at its ends the spoke-wheels L and at or near its center the double-faced cam-wheel M, the rim of which extends between the small friction-rollers $f^2$, journaled on studs rising from the slide-bar F. The cams $m$ project laterally from each side of the wheel M, and these cams are so placed that those on the same face of the wheel will be opposite each other, and will be next to a flat portion of the other face, as clearly shown in Fig. 2.

From the above-described construction of parts it will be seen that when motion is imparted to the cam-wheels the cams $m$ upon opposite sides will alternately strike the stops or rollers $f^2$, and will thus cause the slide-bar to reciprocate, and, through the link E and lever D, to open and close the slides of the seed-boxes, and thus at regular intervals drop the grain. The rotation of the double-faced cam-wheel M is effected by means of the spoke-wheels, the four arms of which wheels are furnished with the forked ends $l$, of such shape as to be caught by the knots upon the check-row line $x$ and be turned thereby until the knot slips from out the fork. The cam-wheel and the spoke-wheels are placed upon the shaft in such relation to each other that the distance through which each knot of the check-row line shall turn the spoke-wheel shall be sufficient to cause a complete action of one of the cams, and consequently a full movement in one direction of the feed-bar. Thus it is that the knots of the line, as they successively catch the forked arms of the spoke-wheels, cause the alternate action of the cams $m$ and the reciprocation of the seed-bar that controls the flow of grain.

As there can be no movement of the spoke-wheels except when a forked arm is caught by a knot of the line, it will be apparent that the movements of the feed-bar depend upon and will correspond exactly with the recurrence of such knots, and the distance between the hills of grain will be uniform.

In order to properly guide the check-row line to the spoke-wheels and across the planter, we have attached to the end standards, H, the guide-arms $H^2$, carrying at their front ends the pulleys $h^2$ and horns or lugs $h^3$, and at their rear ends the rollers $h^4$.

We are aware that it is not new to operate the slide-bar by direct contact therewith of double-faced cam-wheel; but said wheel served also to coact directly with the tappets of the check-wire, and was apt to start prematurely under frictional contact of the wire thereon, making the delivery of the seed irregular. By our invention the cam-wheel has the single function of reciprocating the slide-bar, the intermittent rotation of said wheel being better effected by separate spoke-wheels co-operating with the check-line, aside from which improvement additional elements are introduced by us between the feed and slide bars to effect easier and more uniform checking of the seed. We are further aware that it is not new to mount separate spoke-wheels on same shaft with double-face cam-wheel; but in such instance the cam-wheel did not actuate an evenly-moving reciprocating slide-bar, but a pivoted or rocking trip co-operating with elements differing from ours to ultimately actuate the feed-bar; but we are not aware that prior hereto the check-rower attachment has been constituted with the several elements employed and coacting as defined by our specification.

Having thus described our invention, what we claim as new, and desire to secure by Letters Patent of the United States, is—

In a corn-planter check-rower, the combination, with the main drive-shaft, having spoke-wheels L at its ends and the double-faced cam-wheel M near its center, of the slide-bar F, carrying the stops or rollers $f^2$, located one on each side of said cam-wheel and adapted to engage therewith, the arm $f$, the link E, the pivoted lever D, and the feed-bar C, substantially as described.

In testimony whereof we have hereunto set our hands this 28th day of June, A. D. 1883.

GEORGE W. FLOTT.
JOHN OVERACKER.

Witnesses:
SAMUEL PROBASCO,
JOHN H. KENNEDY.